Patented Mar. 22, 1938

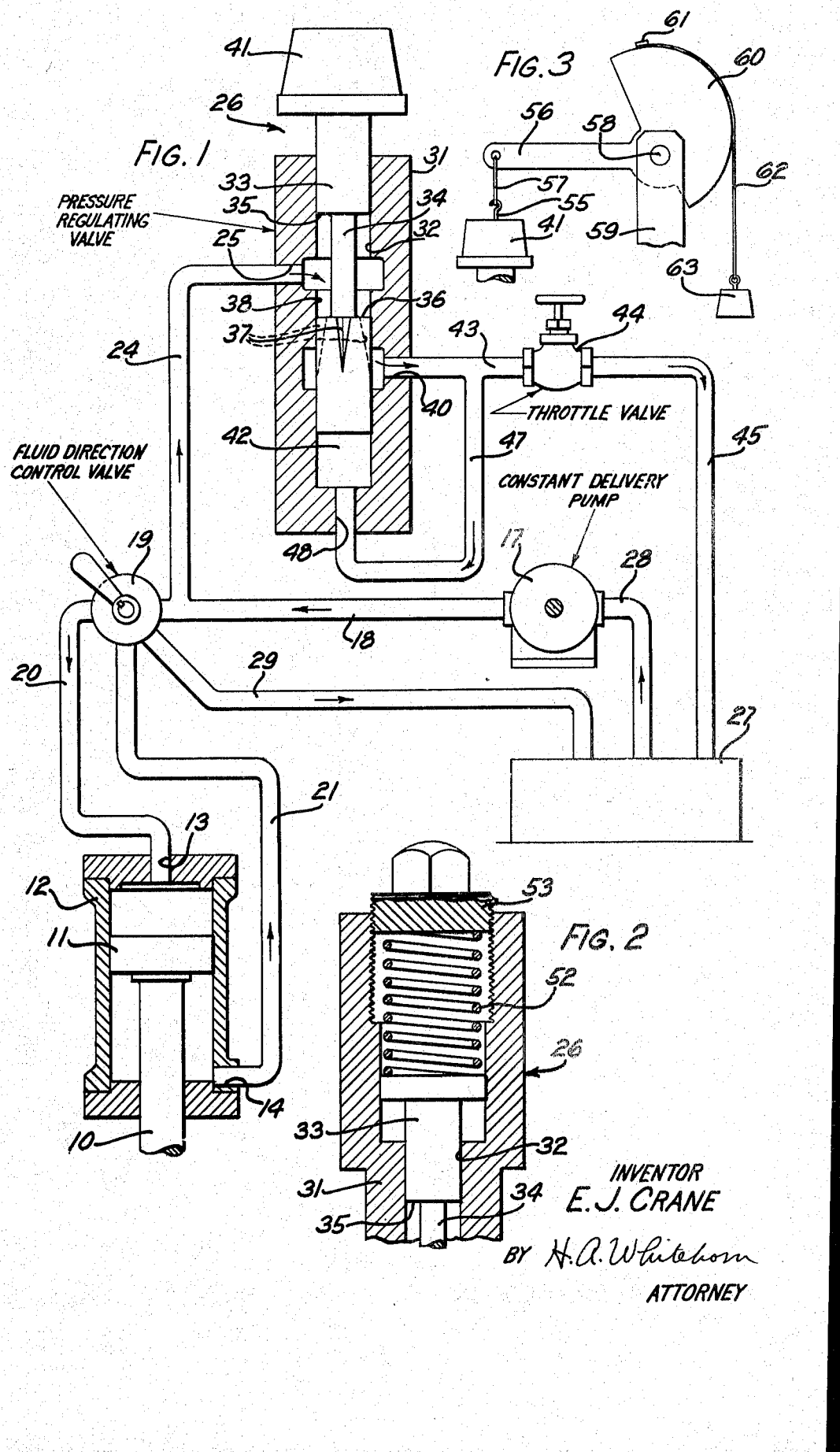

2,111,964

UNITED STATES PATENT OFFICE 2,111,964

LIQUID FLOW CONTROL SYSTEM

Edward J. Crane, Oak Park, Ill., assignor to Western Electric Company, Incorporated, New York, N. Y., a corporation of New York Application October 12, 1932, Serial No. 637,439

2 Claims. (Cl. 60—52)

This invention relates to liquid flow control systems, and more particularly to a system for controlling the flow of liquid under pressure, and is a part continuation of my copending application, Serial No. 468,191, filed July 15, 1930.

The primary object of this invention is to provide an improved hydraulic medium flow control system for operating hydraulic motors.

In accordance with one embodiment of this invention as applied to a reciprocatory type of hydraulic motor, there is provided a liquid flow control system connected to the hydraulic cylinder of the motor, and a constant delivery liquid pump. The control system consists of a by-pass around the pump which includes a manually operable throttle valve which has its discharge side connected to the inlet side of the pump. Also included in the by-pass is a pressure regulating valve with a substantially balanced plunger provided with liquid throttling passages and means for applying a constant force thereto, the inlet side of the pressure regulating valve being connected to the cylinder as well as to the pump and its discharge side connected to the inlet side of the throttle valve. The connection between the valves is also connected to a port in the pressure regulating valve below the plunger thereof. With this arrangement the pressure between the valves is proportional to the constant force applying means acting on the pressure regulating valve plunger. A constant pressure is, therefore, maintained on the inlet side of the throttle valve and this insures a constant rate of flow through the latter and hence a constant rate of flow through the by-pass as a whole, the rate of flow being determined by adjusting the manually operable throttle valve. The maintenance of a constant, manually controllable flow through the by-pass combined with the use of a constant delivery pump makes it possible to operate the reciprocatory motor at any predetermined constant rate of speed.

In another embodiment of the invention the pressure liquid may be caused to be by-passed at a predetermined variable rate of flow, depending upon the resistance encountered by the reciprocatory motor.

Other objects and advantages of this invention will more fully appear from the following detailed description, taken in connection with the accompanying drawing, wherein Fig. 1 is a diagrammatic view, partly in section, of a liquid flow control system embodying the features of this invention applied to a hydraulic motor;

Fig. 2 is an alternative embodiment of the means shown in Fig. 1 for maintaining a substantially constant force on the pressure regulating valve plunger, and Fig. 3 is an alternative embodiment of the invention, shown fragmentarily, for causing the pressure medium to be by-passed at a predetermined variable rate of flow depending upon the resistance encountered by the reciprocatory motor.

Referring now to the drawing, and particularly to Fig. 1, there is illustrated fragmentarily a hydraulically actuated ram 10, which may be connected to a material working apparatus; for instance, a machine tool feed (not shown), the ram being integral at its upper end with a piston 11 reciprocable within a hydraulic motor cylinder 12. The piston 11 is actuated by pressure liquid; for instance, oil, supplied to the cylinder 12 at opposite ends of the piston 11 through the ports 13 and 14 formed in the cylinder. The pressure liquid from the system is supplied from a motor driven constant delivery pump 17 of a known type, shown diagrammatically in Fig. 1, or any suitable source of pressure liquid which will deliver a liquid at a constant rate. The outlet port of the pump 17 is connected by a pipe 18 to a manually operable valve 19 of known construction for controlling the direction of the pressure liquid to and from the motor cylinder, the ports 13 and 14 of the cylinder 12 being connected to the valve 19 by pipes 20 and 21, respectively. Also connected to the pipe 18 is a pipe 24 which directs the pressure liquid from the pump 17 to an inlet port 25 of a pressure liquid regulating valve 26, to be presently described. The inlet port of the pump 17 and also the valve 19 are connected to a liquid supply reservoir 27 by pipes 28 and 29, respectively. Since the details of the pump 17 and the valve 19 are not necessary to a complete understanding of this invention a detailed disclosure and description thereof will not be given herein.

Referring to Fig. 1, the pressure liquid regulating valve 26 comprises a casing 31 provided with a longitudinally extending bore 32 within which is reciprocably mounted a plunger 33 having a reduced intermediate portion 34 providing substantially equal annular pressure surfaces 35 and 36. Formed peripherally in the plunger 33 beginning at the surface 36 are a plurality of equally spaced tapered V-shaped liquid throttling passages or slots 37 through which the pressure liquid is throttled from a chamber 38 of the valve 26 formed between the surfaces 35 and 36 to an outlet port 40 of the valve. The upper end of the plunger 33 extends through the casing 31 and is provided with an enlargement or weight 41, the purpose of which will be made apparent hereinafter. Between the lower end surface of the plunger 33 and the opposed inner surface of the valve casing 31 is a chamber 42. The outlet port 40 of the valve 26 is connected by a pipe 43 to a manually operable valve 44 of a known type, such as an ordinary needle valve, and the outlet side of the latter is connected to the reservoir 27 by a pipe 45. Intermediate the outlet port 40 of the valve 26 and the throttle valve 44 the pipe 43 is connected to a pipe 47 which is connected to a port 48 communicating with the chamber 42 of the valve 26.

The operation of the herein described liquid flow control system, assuming a constant delivery of pressure liquid by the pump 17, and that all slippage of the pump and leakage of the liquid past the piston 11 of the cylinder 12 or other liquid leaks in the system have been suitably compensated for is as follows: It is to be understood that in the normal condition of the liquid flow control system it is filled with liquid. The pressure liquid in the position of the valve 19 as shown in Fig. 1 will be directed from the pump 17 through the pipe 18, valve 19, and the pipe 20 into the upper end of the cylinder 12 and simultaneously through the pipes 18 and 24 into the chamber 38 of the pressure regulating valve 26. The liquid directed into the valve 26 exerts a substantially balanced pressure upon the plunger 33 thereof, as hereinbefore described, and is throttled through the V-shaped slots 37 of the plunger and passes through the outlet port 40, the pipe 43 and the throttle valve 44 to the reservoir 27. By means of the pipe 47 the pressure of the liquid between the valves 26 and 44 is transmitted into the chamber 42 and against the bottom of the plunger 33.

It is evident that with this arrangement the pressure of the liquid between the outlet port 40 of the valve 26 and the throttle valve 44 is proportional to the weight on the valve plunger 33; that is, for any given weight the pressure at this point will remain constant, regardless of the pressure in the pipe 24, which is substantially equal to that in the cylinder 12 and by means of which the working resistance is overcome. The flow through the throttle valve 44 will therefore be constant for any given setting thereof, the valve 44 being set according to the desired speed of operation of the apparatus. Due to the pressure liquid being by-passed at constant rate it will be delivered at a constant rate to the cylinder 12 and therefore the ram 10 will move downwardly at a constant rate of speed, regardless of variations in the working resistance it encounters. For example, if during the downward movement of the ram 10 an increased resistance is encountered, an increase in the pressure of the liquid will occur in the cylinder 12 and a corresponding increase in pressure will be immediately transmitted to the pressure regulating valve 26 by means of the pipe 20, the valve 19 and the pipes 18 and 24, and will cause a momentary increase in the flow of the liquid through the V-shaped slots 37 of the plunger 33 and the throttle valve 44. The increased flow through the throttle valve 44 will raise the pressure in the pipes 43 and 47 between the valves 26 and 44, which increase in pressure is immediately transmitted into the chamber 42 and against the bottom of the plunger 33, causing the latter to move upwardly slightly, thus partially closing the V-shaped slots 37 of the plunger to the flow of the pressure liquid through the valve 26, and thus again restricting the flow through the pipe 43 and throttling valve 44 until the pressure in the pipe 43 is brought back to its original value, where the pressure exerted against the bottom of the plunger 33 again just balances the weight 41. In the case of momentarily reduced pressure of the liquid in the cylinder 12 a similar but reverse action occurs in the system to that hereinbefore described.

In another position of the valve 19 after the ram 10 has been lowered, the pressure liquid may be directed from the pump 17 through the pipe 18, the valve 19, the pipe 21, into the lower end of the cylinder 12 to return the ram 10, and simultaneously therewith the liquid is directed into the valve 26. A similar action to that previously described in connection with the downward movement of the ram 10 takes place in the valve 26 to return the ram 10 at a constant speed, which in the case of some machine tools is desirable. During the downward movement of the ram 10 the liquid below the piston 11 escapes through the pipe 21, the valve 19, and to the reservoir 27 by means of the pipe 29, while during an upward movement thereof the liquid above the piston escapes through the pipe 20, the valve 19 and the pipe 29.

As the purpose of the weight 41 on the valve plunger 33 is merely to maintain a constant force acting against the plunger any suitable means for securing the same result may be employed. In Fig. 2 an alternative means is disclosed comprising a compression spring 52 mounted in the valve casing 31 and acting against the upper end of the plunger 33 with a substantially constant force within the limits of the motion of the plunger 33. The compression of the spring 52 may be regulated by means of an adjustable seat 53 at its upper end. It will be evident that a constant pressure liquid acting against the top of the plunger 33 would also serve the same purpose as the weight 41 or spring 52. By varying the weight 41 or other force acting against the plunger 33 it is possible to cause the pressure liquid to be by-passed at a predetermined variable rate of flow, depending upon the pressure in the cylinder 12. This principle can be used to make the rate of flow vary in any arbitrary way, depending upon the resistance encountered by the ram 10 or other part being moved. For example, in the case of the spring 52 (Fig. 2) the rate at which the liquid is by-passed will increase as the pressure in the cylinder 12 increases.

In the embodiment illustrated in Fig. 3 the upper surface of the weight 41 is connected as indicated at 55 to one arm of a bell crank lever 56 by a flexible member 57, the lever being pivoted at 58 to a stationary bracket 59. Another arm of the lever 56 is in the form of a suitably shaped cam 60 having attached to the upper end of its cam face as indicated at 61 a flexible member 62 to the lower end of which is attached a weight 63. When the weight 41 moves upwardly due to an increase of pressure in the cylinder 12 an increased leverage on the bell crank lever 56 occurs due to the weight 63 moving farther away from the pivot 58 and thus lowering the pressure required in the chamber 42 in order to balance the weights 41 and 63 and associated leverage system. This reduction in pressure in the chamber 42, conduits 47 and 43 will result in a reduction of the rate at which the pressure medium is discharged through the throttle valve 44. In the case of reduced pressure in the cylinder 12 a similar but reverse action occurs in the system to that just described. It will be obvious that increased hydraulic slippage, liquid leaks and the reduced pump motor speed normally occurring at increased pressures can be readily compensated for by proper proportioning of the parts.

It is believed that the advantages of the present invention will be clearly apparent from the above detailed description. By the use of the invention a hydraulically operated motor may be operated at predetermined rates of speed, regardless of the fact that the resistance it encounters may vary within wide limits.

The liquid flow control system embodying the features of this invention has been disclosed as applied to a reciprocatory type of hydraulic motor for use in connection with machine tools, but it will be obvious that it may also be applied to hydraulic motors of known construction designed to deliver rotary motion, and also to any hydraulic mechanism where it is desired to by-pass a part of the liquid at a constant rate.

It is to be understood that in the specification and claims the expressions "substantially constant flow" and "substantially constant pressure" do not take into account controllable variables, such as the viscosity of the oil, since these may or may not be of sufficient magnitude to require correction. Obviously such variables should be controlled so as to enable the machine to operate with sufficient accuracy for the particular work being done, but for some purposes no special control of these variables may be needed. In order to simplify the disclosure the drawing has been made schematic and since accessory controls of the kind just mentioned are well known, no attempt has been made to illustrate them.

Although the invention has been disclosed as applied to a particular type of hydraulic motor for use with a material working apparatus, and is shown in diagrammatic form, it is clear that modifications can be made without departing from the spirit and scope of the appended claims.

What is claimed is:

1. A hydraulic flow control system comprising a source of pressure medium delivering at a constant rate, motor means actuated by said pressure medium, a conduit for by-passing a portion of said pressure medium from said motor means, a by-pass valve in said conduit, and a pressure equalizing valve arranged in said conduit between said motor means and said by-pass valve, said pressure equalizing valve being operably responsive to variations in pressure applied to said motor means for maintaining constant the pressure applied to said by-pass valve, said by-pass valve being adjustable to vary the speed of the motor means.

2. A hydraulic flow control system comprising a source of pressure medium delivering at a constant rate, motor means actuated by said pressure medium, a conduit for by-passing a portion of said pressure medium from said motor means, a throttling valve in said conduit adjustable to have an orifice of fixed size, and means in said conduit preceding said throttling valve in the direction of flow of said pressure medium for maintaining a constant pressure of the pressure medium on said throttling valve orifice, whereby for a given adjustment of said throttling valve the speed of said motor means is maintained constant when the load thereon varies.

EDWARD J. CRANE.